United States Patent [19]

Carter et al.

[11] Patent Number: 4,946,873
[45] Date of Patent: Aug. 7, 1990

[54] PREPOLYMERS CONTAINING IMIDE LINKAGES

[75] Inventors: Steve Carter, Leuven; David Thorpe, Everberg, both of Belgium

[73] Assignee: Imperial Chemical Industries PLC, London, England

[21] Appl. No.: 304,487

[22] Filed: Feb. 1, 1989

[30] Foreign Application Priority Data

Feb. 5, 1988 [GB] United Kingdom ............... 8802672

[51] Int. Cl.$^5$ ................ C07D 209/90; C07D 209/32; C08 9/00
[52] U.S. Cl. .................... 521/185; 521/184; 548/477; 548/451
[58] Field of Search ............. 548/451, 477, 454; 528/73, 322; 521/163, 184, 185

[56] References Cited

U.S. PATENT DOCUMENTS

| | | | |
|---|---|---|---|
| 3,300,420 | 1/1967 | Frey | 521/167 |
| 3,562,189 | 2/1971 | Farrissey et al. | 528/73 |
| 3,772,216 | 11/1973 | Rosser | 521/112 |
| 3,817,926 | 6/1974 | Pauze et al. | 528/73 |
| 3,959,233 | 5/1976 | Hanson | 528/73 |
| 4,026,833 | 5/1977 | D'Alelio | 521/157 |
| 4,177,333 | 12/1979 | Riccitiello et al. | 521/124 |
| 4,184,021 | 1/1980 | Frosch et al. | 521/106 |
| 4,315,076 | 2/1982 | Gagliani et al. | 521/185 |
| 4,361,453 | 11/1982 | Gagliani et al. | 521/185 |
| 4,487,908 | 12/1984 | Dominguez | 528/73 |
| 4,544,734 | 10/1985 | McCready | 528/289 |
| 4,696,954 | 9/1987 | Pritchard et al. | 521/163 |
| 4,705,834 | 11/1987 | Baur et al. | 528/73 |
| 4,883,827 | 11/1989 | Ferro | 521/185 |

Primary Examiner—Veronica P. Hoke
Attorney, Agent, or Firm—Cushman, Darby & Cushman

[57] ABSTRACT

Compound having the formula

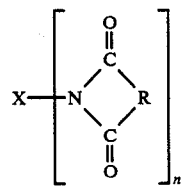

wherein
X is the residue of a polyoxyalkylene diamine or triamine having an average equivalent weight of at least 500, after having deleted the two or three amine groups,
n is two if X is a residue of a diamine and three if X is a residue of a triamine, and
R is the residue of a cyclic anhydride of a polycarboxylic acid having at least four carboxyl groups, after having deleted one group

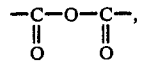

prepolymers comprising such compounds and polyimide foams prepared from such compounds and prepolymers. The foams have good mechanical-, fire retardant- and smoke emission properties.

16 Claims, No Drawings

PREPOLYMERS CONTAINING IMIDE LINKAGES

This invention relates to compounds and prepolymers containing imide linkages and to the preparation of said compounds and prepolymers, to foams made from said compounds and prepolymers and to processes for making such foams.

The preparation of polyimide foams by reacting organic polyisocyanates with aromatic polycarboxylic acid dianhydrides has already been proposed, for example by Frey in U.S. Pat. No. 3,300,420 and in several subsequent publications such as U.S. Pat. No. 3,772,216, 4,177,333 and 4,184,021.

The methods described provide rigid foams having many valuable properties including high levels of heat resistance and flame resistance. Unfortunately, the dianhydrides used in the reaction are solid materials at normal ambient temperatures (pyromellitic dianhydride having a melting point of 286° C.) putting the process at a disadvantage compared with the processes used in the manufacture of polyurethane and polyisocyanurate foams where the principal ingredients are generally liquids at room temperature.

U.S. Pat. No. 4,026,833 discloses solid polyimide products prepared from an aromatic dianhydride, an aromatic diamine and optionally an organic monoamine and foams prepared from such products and a polyisocyanate.

U.S. Pat. No. 4,544,734 discloses polyetherimide esters prepared from a diol, a dicarboxylic acid and a combination of a polyoxyalkylene diimide diacid and a dimer acid. The polyoxyalkylene diimide diacid is prepared by the imidization reaction of a tricarboxylic acid containing two vicinal carboxyl groups or an anhydride group and an additional carboxyl group with a high molecular weight polyoxyalkylene diamine. The diimide diacid has not been proposed for preparing polyimide foams.

Surprisingly, a novel compound and a novel liquid prepolymer have been found, showing higher reactivity with respect to polyisocyanates and often lower viscosity than the above diimide diacids and providing a possibility to prepare fully polyimide foams having good mechanical- fire retardant- and smoke emission properties.

Accordingly, the present invention is concerned with a compound having the formula

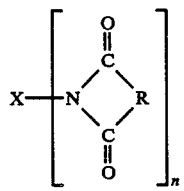

wherein
X is the residue of a polyoxyalkylene diamine or triamine having an average equivalent weight of at least 500, after having deleted the two or three amine groups.
n is two if X is a residue of a diamine and three if X is a residue of a triamine, and
R is the residue of a cyclic anhydride of a polycarboxylic acid having at least four carboxyl groups, after having deleted one group

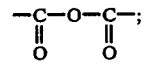

and with a liquid prepolymer comprising the above compound and in particular with a liquid prepolymer comprising the reaction product of a polyoxyalkylene diamine or triamine having an average equivalent weight of at least 500 and at least one mole per amine equivalent of a cyclic anhydride of a polycarboxylic acid having at least four carboxyl groups and with a process for preparing such compounds and prepolymers by reacting the diamine or triamine with the cyclic anhydride. In general the amount of the formula compound in the liquid prepolymer will range from 50% w-95% w and preferably from 70% w-95% w. The preferences for the residues X and R are identical to those for the amines and anhydrides, where these residues have been derived of and which will be described hereinafter.

Apart from the formula compound the prepolymer in general comprises unreacted cyclic anhydride, a low amount of dimer, trimer and higher polymeric derivatives of the formula compound and derivatives wherein not every amine has reacted with an anhydride. The amounts of unreacted cyclic anhydride, polymeric derivatives and derivatives wherein not every amine has reacted with an anhydride in the prepolymer depend on the extent of the excess of the cyclic anhydride used.

In general the prepolymer is obtained by removing solvent and water formed during the reaction e.g. by evaporation, while the compound is obtained in purified form by removing, e.g. by chromatography, selective precipitation and/or extraction, the above-mentioned unreacted cyclic anhydride, polymeric derivatives and derivatives wherein not every amine has reacted with an anhydride.

The compound and the prepolymer may be used for preparing polyimide foams. Since the prepolymer is equally valuable for many purposes the use of the prepolymer for preparing polyimide foams is economically attractive since it avoids a purification step.

Polyoxyalkylene diamines and triamines which may be used in the preparation of the prepolymers particularly include polyethers having primary amino terminal groups wherein the oxyalkylene residues are oxyethylene, oxypropylene or oxybutylene residues or mixtures of such residues arranged randomly or in blocks. Mixtures of diamines and/or triamines may be used if desired. Such mixtures may include diamines or triamines having equivalent weights of less than 500 provided the average equivalent weight, based on amino groups, of the amines reacted with the anhydride is at least 500. Suitable diamines and triamines, generally having equivalent weights of from 200 to 5000, are well known having been fully described in the literature and being commercially available under the trade name "Jeffamine" from the Texaco Chemical Company. Other suitable diamines and triamines may be obtained by hydrogenation of the cyanoethylation products of polyoxyalkylene diols and triols.

Cyclic anhydrides of polycarboxylic acids having at least four carboxyl groups which may be used in the preparation of the prepolymers particularly include aromatic carboxylic acid anhydrides having no free carboxyl groups and more particularly aromatic tetracarboxylic acid dianhydrides, for example the dianhydrides of pyromellitic acid, benzene-1,2,3,4-tetra-carboxylic acid, diphenyl-3,3,,4,4,- and 2,2,,3,3,-tetra-carboxylic acids and naphthalene-1,2,4,5-, 1,4,5,8- and 2,3,6,7-tetracarboxylic acids as well as similar tetracarboxylic dianhydride derivatives of anthraquione, phenanthrene, perylene, diphenylmethane, diphenyl sulphone, diphenyl ether, benzophenone and the like. Other suitable anhydrides, like 5-(2,4-dioxotetrahydro-3-furanyl)-3-methyl-3-cyclohexene-1,2-dicarboxylic anhydride, may be used as well. Mixtures of two or more anhydrides may be employed if desired. The dianhydride of pyromellitic acid is the most preferred anhydride.

Reaction between the diamine or triamine and the anhydride may be effected in the absence or presence of inert liquid reaction media or solvents, for example toluene, at temperatures of up to 250° C., especially in the range 50–100° C., and at pressures which may be atmospheric, sub-atmospheric or superatmospheric. In general reaction time will not be shorter than 1 hour and longer than 12 hours. At least two moles of anhydride per mole of diamine or at least three moles of anhydride per mole of triamine are used, the diamine or triamine preferably being added slowly to the anhydride so that the latter is always present in excess. Generally the relative amounts of anhydride and amine applied are such that there are 1,25–10 anhydride groups in the reaction mixture for each amine group. Preferably the amount is 2–4 anhydride groups for each amine group. Any solvents used may be removed by conventional techniques.

The prepolymers of the invention are liquids at normal ambient temperatures and often have relatively low viscosities. They are suitable, therefore, for mixing at room temperature with organic polyisocyanates with which they react forming polyimide foams.

In a further embodiment of the, invention, there is provided a polyimide foam obtained by reacting an organic polyisocyanate with a liquid prepolymer comprising the reaction product of a polyoxyalkylene diamine or triamine having an average equivalent weight of at least 500 and at least one mole per amine equivalent of a cyclic anhydride of a polycarboxylic acid having at least three carboxyl groups.

Such polyimide foams, especially foams of a flexible nature evolve minimal smoke at combustion temperatures and, being non-melting, do not assist the spreading of fire to adjacent areas.

The liquid prepolymer may be one of the prepolymers discussed before or a liquid prepolymer comprising the reaction product of a polyoxyalkylene diamine or triamine having an average equivalent weight of at least 500 and at least one mole per amine equivalent of a cyclic anhydride of a polycarboxylic acid having three carboxyl groups.

Cyclic anhydrides of polycarboxylic acids having three carboxyl groups in particular include aromatic anhydrides such as the anhydride of trimellitic acid. Mixtures of anhydrides of polycarboxylic acids with three and four or more carboxyl groups may be used as well. The amines used and the conditions for preparing liquid prepolymers from a cyclic anhydride of a polycarboxylic acid having three carboxyl groups are essentially the same as described previously for preparing such prepolymers from a cyclic anhydride of a polycarboxylic acid having at least four carboxyl groups.

Most preference is given to the use of prepolymers from aromatic carboxylic acid anhydrides having no free carboxyl groups and in particular to aromatic tetracarboxylic acid dianhydrides. The bond between such an anhydride and the amine is an imide bond and the bond between such a prepolymer and a polyisocyanate is an imide bond as well; hence a fully polyimide foam is provided. Further such prepolymers are more reactive with respect to polyisocyanates than prepolymers having free carboxyl groups.

In addition to that, foams made from such prepolymers are more solvent resistant and stable to heat and hydrolysis than foams prepared from prepolymers having free carboxyl groups.

Organic polyisocyanates which may be used in preparing the polyimide foams include aliphatic and cycloaliphatic polyisocyanates such as hexamethylene diisocyanate, isophorone diisocyanate and dicyclohexylmethane diisocyanate but it is preferred to use aromatic polyisocyanates such as those already used or proposed to be used in the manufacture of polyurethanes. Particular, mention may be made of toluene diisocyanates, diphenylmethane diisocyanates and polymethylene polyphenylene polyisocyanates in their various commercial forms. For ease of mixing with the liquid prepolymers, it is preferred to use liquid aromatic polyisocyanates, especially the above mentioned polymethylene polyphenylene polyisocyanates (often known as crude or polymeric MDI) and MDI variants, that is to say diphenylmethane diisocyanate that has been modified by the introduction of urethane, allophanate, urea, biuret, isocyanurate, carbodiimide or uretonimine groups.

Reaction between the liquid prepolymer and the organic polyisocyanates may be effected at normal or elevated temperatures but in general it is necessary to heat the reaction mixture at some stage in order to provide a fully cured foam, temperatures of up to 300° C., for example 80–120° C., being typical. Suitable heating techniques include the application of high frequency radiation, for example microwave radiation. As a result of the reaction between the free anhydride groups present in the prepolymer and the isocyanate groups of the polyisocyanate, a polyimide is formed and carbon dioxide is evolved giving a foamed structure. The prepolymers derived from the mono-anhydrides of tricarboxylic acids can be expected to contain free carboxylic acid groups in addition to or in place of anhydride groups and consequently the foams obtained from those prepolymers will contain not only imide but also amide linkages. If desired, further foaming may be provided by including an additional foaming agent in the reaction mixture, for example water to react with the polyisocyanate or volatile blowing agents.

In addition to the prepolymer, the polyisocyanate and optional further blowing agent, the foam-forming reaction mixture may contain other conventional ingredients of such reaction mixtures. Such ingredients include catalysts for the reaction of isocyanates, for example tin compounds such as stannous octoate and tertiary amines such as triethylamine, surface active agents or foam stabilisers such as siloxaneoxyalkylene copolymers and fire retardants, for example compounds containing phosphorus and/or halogen atoms.

The polyimide foams of the invention are useful materials possessing excellent mechanical properties which are maintained over a wide range of temperatures. When subjected to fire, the foams eventually burn but, unlike many polymeric foams, produce little smoke and do not melt or drip and therefore do not contribute to the spread of the fire to other materials.

The foam-forming reaction mixture may also contain other isocyanate-reactive materials, for example polyols having equivalent weights of from 31 to 6000 or polyamines having equivalent weights of from 30 to 6000. By including such materials, foams will be obtained having useful properties but lower resistance to the effects of fire and high temperatures.

The invention is illustrated but not limited by the following Examples in which all parts are by weight unless otherwise stated.

EXAMPLE 1

200 g of 1,2,4,5-benzenetetracarboxylic dianhydride was dissolved in 400 ml of anhydrous DMF (dimethylformamide). To this solution at 80° C. was added 100 g of Jeffamine T 5000 dissolved in 50 ml of DMF dropwise over 1 hour. The reaction mixture was heated at 140° C. for 2 hours. The reaction mixture was allowed to cool and poured into 500 ml anhydrous ethyl acetate. A precipitate of unreacted dianhydride forms on standing. The slurry is allowed to stand for a further 12 hours and then filtered. The solvent is evaporated under reduced pressure leaving an oil residue. This residue was passed down a thin-film evaporator as in example 2. The desired product was obtained as a light brown oil, viscosity 30 poise (25° C.); shown to be 90-95% pure anhydride-capped polyoxyalkylene triimide of, pyromellitic anhydride and Jeffamine T 5000 by IR-spectroscopy, C-13 NMR-spectroscopy and gas phase chromatography. This product (83 parts), Dow corning silicone oil DC 193 (surfactant, 2 parts), N-Ethylmorpholine (catalyst, 2 parts) and Suprasec DNR (polyisocyanate, 25 parts) were mixed vigorously and then placed in a cardboard cup and heated by microwave for 10 minutes. A cured flexible polyimide foam was obtained.

EXAMPLE 2

1,2,4,5-Benzenetetracarboxylic dianhydride (195 g) was suspended in toluene (1500 ml) in a 2 l. flask under a dry nitrogen atmosphere. The suspension was heated to 60° C. and 1000 g of a glycerol-initiated 5000 molecular weight primary amine terminated polyoxypropylene triamine, available from Texaco Chemical Corporation as "Jeffamine T-5000", was added dropwise over 1 hour. The agitation and heating were then maintained for a further 1.5 hours after which time the reaction mixture was concentrated by rotary evaporation (80° C./20 mm Hg), approximately 1000 ml of toluene being removed.

The remaining concentrated mixture was then passed down a vertical thin-film evaporator (column temperature 196° C.; pressure 20 mm Hg) leaving the imide-anhydride prepolymer as a slightly opaque liquid.

The prepolymer (83.3 parts) was blended with tris-(2-chloropropyl) phosphate (13.3 parts), Goldschmidt silicone oil Tegostab B8404 (1.7 parts) and N,N-dimethylcyclohexylamine (1.7 parts). This formulation was then mixed with 20 parts of a polymethylene polyphenylene polyisocyanate composition containing approximately 50% of diphenylmethane diisocyanates. The resulting liquid, in a metal container, was placed in an oven at 100° C. After 15-30 minutes, a cured flexible polyimide foam was obtained. The foam had good physical properties (see Table 1).

EXAMPLE 3

A prepolymer was prepared as described in Example 2 except that the 1,2,4,5-benzenetetracarboxylic dianhydride was replaced by 289 g of 3,3',4,4'-benzophenonetetracarboxylic dianhydride.

The prepolymer (95.9 parts) was blended with Dow Corning silicone oil DC 193 (2 parts), N-ethylmorpholine (2 parts) and Dow Corning silicone oil DC 200 (0.1 part). This formulation was then mixed with 25 parts of the polyisocyanate composition described in Example 2 and foamed as described in that Example. The open-celled polyimide foam obtained had good physical properties.

EXAMPLE 4

1,2,4,5-Benzenetetracarboxylic dianhydride (21.8 g) was suspended in toluene (500 ml) under a dry nitrogen atmosphere. The suspension was heated to 80° C. and 100 g of a linear 2000 molecular weight primary terminated polyoxypropylene diamine, available form Texaco Chemical Corporation as "Jeffamine D-2000", was added dropwise over 1 hour. Heating was continued for a further 1.5 hours after which time the reaction mixture was concentrated by rotary evaporation (80° C./20 mm Hg), approximately 300 ml of toluene being removed. The resulting concentrate was passed through a thin-filmed evaporator (column temperature 163° C.; 20 mm Hg) leaving the imide-anhydride prepolymer as a clear mobile liquid. The prepolymer (87.3 parts) was blended with Dow Corning silicone oil DC 193 (1.8 parts), propylene carbonate (7.3 parts) and N,N-dimethylcyclohexylamine (3.6 parts). This formulation was then mixed with (32.7 parts) of Suprasec DNR (trademark of Imperial Chemical Industries, a polymethylene polyphenylene polyisocyanate) and foamed as described in Example 2. The physical properties are listed in Table 1.

EXAMPLE 5

Example 4 was repeated with the proviso that for making the prepolymer 38.4 g of trimellitic anhydride was used instead of 21.8 g of 1,2,4,5- benzenetetracarb,oxylic dianhydride.

The physical properties of the foams obtained in examples 2, 4 and 5 are listed in Table 1.

TABLE 1

|  | Examples | | |
| --- | --- | --- | --- |
|  | 2 | 4 | 5 |
| Density (Kg/m$^3$) | 39 | 40 | 39' |
| Compression set (kN/m$^2$) (50%) | 3.2 | 3.4 | 3.2 |
| Tensile Strength (kN/m$^2$) (50% Elongation) | 30 | 36 | 23 |
| Tear (N/m) | 65 | 68 | 53 |
| Oxygen Index | 23 | 22.5 | 19 |
| NBS smoke chamber test (ASTM E662-83) | 185 | 60 | 55 |

It should be noted that a low value of the smoke test for a polyurethane foam Would be 100, but more typically 150-200 is normal. The high value of the foam prepared in Example 2 regarding the smoke test is because of the presence of a fire retardant.

We claim:

1. Compound having the formula

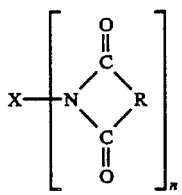

wherein

X is the residue of a polyoxyalkylene diamine or triamine having an average equivalent weight of at least 500, after having deleted the two or three amine groups, n is two if X is a residue of a diamine and three if X is a residue of a triamine, and R is the residue of a cyclic anhydride of an aromatic polycarboxylic acid having four carboxyl groups, after having deleted one group

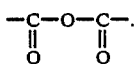

2. Liquid prepolymer comprising a compound according to claim 1.

3. A liquid prepolymer comprising the reaction product of a polyoxyalkylene diamine or triamine having an average equivalent weight of at least 500 and at least one mole. per amine equivalent of a cyclic anhydride of an aromatic polycarboxylic acid having four carboxyl groups.

4. A liquid prepolymer according to claim 3 wherein the polyoxyalkylene diamine or triamine is a polyoxypropylene diamine or triamine.

5. A liquid prepolymer according to claim 3 wherein the cyclic anhydride is an aromatic tetracarboxylic acid dianhydride.

6. Process for preparing a compound according to claim 1 by reacting a polyoxyalkylene diamine or triamine having an average equivalent weight of at least 500 and at least one mole per amine equivalent of a cyclic anhydride of an aromatic polycarboxylic acid having four carboxyl groups and by purifying the compound according to claim 1 from the reaction mixture.

7. Process for preparing a liquid prepolymer according to claim 2 by reacting a polyoxyalkylene diamine or triamine having an average equivalent weight of at least 500 and at least one mole per amine equivalent of a cyclic anhydride of an aromatic polycarboxylic acid having four carboxyl groups.

8. Process for preparing a liquid prepolymer according to claim 3 by reacting a polyoxyalkylene diamine or triamine having an average equivalent weight of at least 500 and at least one mole per amine equivalent of a cyclic anhydride of an aromatic polycarboxylic acid having four carboxyl groups.

9. A polyimide foam obtained by reacting an organic polyisocyanate with a liquid prepolymer comprising the reaction product of a polyoxyalkylene diamine or triamine having an average equivalent weight of at least 500 and at least one mole per amine equivalent of a cyclic anhydride of an aromatic polycarboxylic acid having three or four carboxyl groups.

10. A foam according to claim 9 wherein the polyoxyalkylene diamine or triamine is a polyoxypropylene diamine or triamine.

11. A foam according to claim 9 or 10 wherein the cyclic anhydride is an aromatic tetracarboxylic acid dianhydride.

12. A foam according to claim 9, wherein the polyisocyanate is a liquid aromatic polyisocyanate.

13. A foam according to claim 9, wherein the polyisocyanate is a liquid polymethylene polyphenylene polyisocyanate.

14. A polyimide foam obtained by reacting an organic polyisocyanate with a compound according to claim 1.

15. Process for preparing a polyimide foam by reacting an organic polyisocyanate with a liquid prepolymer comprising the reaction product of a polyoxyalkylene diamine or triamine having an average equivalent weight of at least 500 and at least one mole per amine equivalent of a cyclic anhydride of an aromatic polycarboxylic acid having three or four carboxyl groups.

16. Process for preparing a polyimide foam by reacting an organic polyisocyanate with a compound according to claim 1.

* * * * *